Feb. 20, 1934.  C. J. BRISTOL  1,948,367
AUTOMOBILE LIFT JACK
Filed Jan. 7, 1933
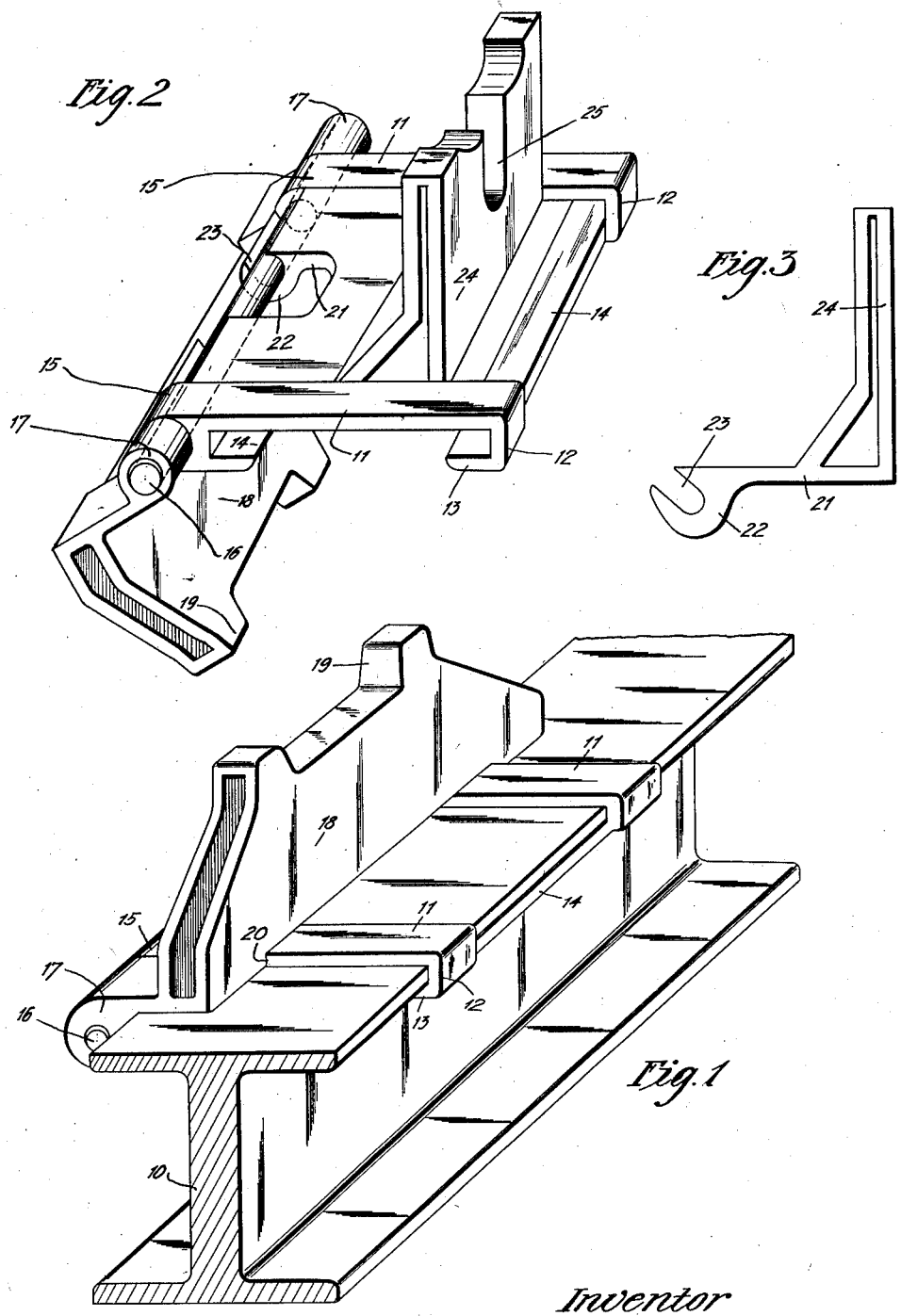
Inventor
Cyrus J. Bristol
by Orwig & Haque Attys.

Patented Feb. 20, 1934

1,948,367

UNITED STATES PATENT OFFICE 1,948,367

AUTOMOBILE LIFT JACK

Cyrus J. Bristol, Des Moines, Iowa, assignor to Globe Machinery & Supply Company, Des Moines, Iowa, a corporation of Iowa Application January 7, 1933. Serial No. 650,640

6 Claims. (Cl. 254—89)

My invention is intended for use in connection with that class of automobile lifts commonly known as "free wheelers", and which are ordinarily formed with two longitudinally arranged spaced apart T rails to engage automobile axles, and these rails are commonly spaced apart a considerable distance less than the tread of the automobile wheels, so that when the lift is in its lowered position the automobile may be driven over the T rails and then when the lift is elevated, the T rails will engage the automobile axles and elevate it and leave the automobile wheels free to revolve.

In lifts of this character it has been customary to provide some form of so-called automobile lift jacks to be placed on top of the T rails for engaging the automobile axle. It is very difficult to have access to these jacks for moving them longitudinally on the rails after an automobile is in position, and it frequently happens that gasoline tanks and other devices project down from the under side of an automobile to such an extent that any projection in the nature of a jack that normally rises above the T rails interferes with the movement of such automobiles relative to the lift.

The object of my invention is to provide a jack especially adapted for free wheeling automobile lifts, which jack is of simple, durable and inexpensive construction, and which normally occupies a space adjacent to the outer side of the automobile lift T rails and does not project above the top thereof, so that said jacks will not in any way interfere with any gasoline tank or other downward extension from the automobile.

A further object is to provide a jack of this character which may be readily and easily moved by the operator with a rod or the like longitudinally upon the lift rails to be accurately positioned under the automobile axles, and also to provide a jack of this character in which the upright jack member may, when properly positioned, be readily and easily swung by the operator with a rod or the like to its upright position for engaging the axle.

In the use of automobile lifts of this character it frequently occurs that automobiles are presented for lifting, and which automobiles are provided with truss rods or other obstructions or projections on the under sides of their axles, and one of the objects of my invention is to provide a detachable jack member formed with slots or the like, especially adapted to receive truss rods, and so arranged that these auxiliary jack members may be readily, quickly and easily placed into position without in any way interferring with the main jack member or its supporting base.

A further object is to provide a device of this character in which, when in use, all of the parts are firmly and securely held together and braced against all strains to which they are ordinarily subjected.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows an isometric view illustrating a portion of an automobile lift T rail with my improved jack in position thereon ready for use.

Figure 2 shows a similar view illustrating the main jack member placed in its inoperative position and a supplemental jack member having a slot for truss rods placed in position for use; and Figure 3 shows a side elevation of the auxiliary jack member.

Referring to the accompanying drawing, I have used the numeral 10 to indicate generaly a T rail which, it is understood, forms part of an automobile lift of the free wheeling type. My improved jack comprises a base formed of two cross members 11, shaped to fit across the top of the T rail 10, and having their ends extended downwardly at 12, and then inwardly at 13, to engage the under surface of the T rail head. These two end members are preferably connected by longitudinal connecting members 14.

The outer ends of the members 11 are formed with hinged members 15, through which there is extended a hinge pin 16, the ends of which project beyond the members 11, the central portion of which is exposed and normally lies parallel with and slightly outside of the outer edge of the top flange of the T rail 10.

Pivoted to the end portions of the hinge pin 16 is the body portion 17 of the jack member, and the jack member proper consists of an upright longitudinally arranged body 18 having a notch at 19 on its top surface to receive an automobile axle, and having downwardly extended shoulders at 20 to engage the outer edges of the base members 11, as clearly shown in Figure 1.

In practical use with this portion of my device, the jack member is normally located in a downwardly and inwardly inclined position adjacent to the outer surface of the automobile lift T rail in the position shown by solid lines in Figure 2, and when in this position the automobile may be driven to position with the axles thereof adjacent the jacks and with the automobile wheels resting upon the floor adjacent the outer surface of the T rail 10 of the lift. When the automobile is thus positioned, the operator, either by hand or with a rod, first slides the jack base longitudinally of the automobile lift T rail until the jack bases are under the automobile axle. He then swings the jack member 18 to the position shown in Figure 1 and directly beneath the axles. Then when the power is applied to raise the automobile lift, the jack members 18 engage the automobile axle and elevate the automobile and firmly hold it in proper position for servicing.

In this connection, attention is called to the fact that when the jack member 18 is in its lowered position, it will not in any way interfere with downwardly projecting gasoline tanks, truss rods or other obstructions projecting downwardly from the under surface of the automobile, and after the lift has been lowered, the operator may then easily swing the jack 18 outwardly and downwardly so that the automobile may be removed without danger of injury to any downwardly projecting parts thereof.

In order to provide an efficient jack for use in connection with automobiles having truss rods under their axles or other obstructions, I have provided an auxiliary jack member comprising a base 21 designed to rest on top of the T rail of the automobile lift, and having a downwardly extended lug 22 at its outer side provided with a slot 23 extended upwardly and outwardly, as shown in Figure 3, and on the inner edge of the base 21 is an upright jack member 24 having formed in the central portion of its top a slot 25 shaped to receive a truss rod when the upper end of the jack member 24 engages an automobile axle.

By providing the slot 23 in the manner shown, this auxiliary jack member may be readily, quickly and easily applied by simply slipping the slotted members 22 over the exposed central portion of the hinge pin 16, and then swinging it inwardly and downwardly until the base 21 rests on top of the T rail of the lift and between the members 11 of the base, and when in this position it is firmly held against any pressures to which it is liable to be subjected when in use, thus dispensing with the necessity of any bolts or other detachable fastening devices.

With this auxiliary jack member, and when an operator finds an automobile having truss rods under its axle or other projection, the auxiliary member may be placed in position before the automobile is driven over the T rails, and then the auxiliary jack may be swung to its position for use, so that the auxiliary jack does not project to any considerable extent above the T rail when the automobile is driven to position over the jacks.

I claim as my invention:

1. An automobile lift jack comprising a base shaped to be slidingly supported on an automobile lift rail, a hinge pin supported by said base in position parallel with and adjacent one side edge of a lift rail and below a plane common to the top surface of the lift rail, and a jack member pivoted to said hinge pin and formed with an automobile axle engaging member capable in one position of assuming an upright position and resting on a lift rail for engaging an automobile axle, and also capable of swinging outwardly and downwardly to a position adjacent the side of an automobile lift rail.

2. An automobile lift jack comprising a base member having two end portions each shaped to rest on top of an automobile lift rail and project under the side edges of the top of said rail to slidingly support the base on a rail, a hinge pin mounted in the outer ends of said end portions, parallel with and adjacent the outer side of a lift rail, a jack member comprising an upright portion notched at its top edge to receive an automobile axle and having its lower end resting upon said base member and engaging the outer end edges thereof, hinge members fixed to said jack member and projected laterally outwardly therefrom and connected to said hinge pin, said jack member being capable of swinging outwardly and downwardly to a position adjacent the outer face of an automobile lift rail.

3. An automobile lift jack comprising a base shaped to slidingly engage a lift rail, and a jack member having an upright portion shaped to engage an automobile axle, said base and jack member having co-acting locking means so arranged that when said jack is in normal position it is locked against lateral movement and when tilted from normal position it may be detached from the base member.

4. An automobile lift comprising a base member having two spaced end portions each shaped to rest transversely on top of an automobile lift rail and project under the side edges of the top of said rail, the turned under portions of said end portions being connected by longitudinal connecting members, the outer portions of said end members being adapted to support a hinge pin, a hinge pin mounted in said end portions parallel with and adjacent to the outer side of a lift rail and beneath a plane common to the top surface of said lift rail, a jack member comprising an upright portion notched at its top edge to receive an automobile axle and having its lower end resting on said end portions, said jack having a recess to form shoulders to engage the front and back edges of said end members, hinge members fixed to said jack and projecting laterally outwardly therefrom and connected to said hinge pin, said jack being capable of swinging outwardly and downwardly to a position adjacent to the outer surface of an automobile lift rail.

5. An automobile lift jack comprising a base shaped to be slidably supported on an automobile lift rail, a hinge pin supported by said base in position with and adjacent to one side of a lift rail, a jack member pivoted to said hinge pin and formed with an automobile axle engaging member capable in one position of assuming an upright position and engaging an automobile axle and also capable of swinging to a position adjacent to the side of an automobile lift rail, said base and jack members having coacting locking means so arranged that when the jack is in a normal position its free end is locked against movement longitudinally.

6. An automobile lift jack comprising a base member shaped to rest on top of an automobile lift rail and project under the side edges of the top of said rail to slidingly support the base on a rail, a hinge pin mounted in the base member, parallel with and adjacent the side of a lift rail, a jack member comprising an upright portion notched at its top edge to receive an automobile axle and having its lower end resting upon said base member, hinge members fixed to said jack member and projected laterally therefrom and connected to said hinge pin, said jack member being capable of swinging laterally and downwardly to position adjacent the face of an automobile lift rail.

CYRUS J. BRISTOL.